United States Patent [19]

Keller et al.

[11] Patent Number: 5,756,629
[45] Date of Patent: May 26, 1998

[54] METHOD FOR SYNTHESIS OF LINEAR INORGANIC-ORGANIC HYBRID POLYMERS

[75] Inventors: Teddy M. Keller, Alexander, Va.; Raj A. Sundar, Baskins Ridge, N.J.

[73] Assignee: The United States of America as represented by the Secretary of the Navy, Washington, D.C.

[21] Appl. No.: 757,170

[22] Filed: Nov. 27, 1996

[51] Int. Cl.$^6$ .................................... C08G 77/56
[52] U.S. Cl. .................. 528/5; 578/33; 578/32; 578/25
[58] Field of Search ..................... 528/32, 25, 33

[56] References Cited

U.S. PATENT DOCUMENTS

| | | | |
|---|---|---|---|
| 5,272,237 | 12/1993 | Keller et al. | 528/5 |
| 5,292,779 | 3/1994 | Keller et al. | 522/99 |
| 5,348,917 | 9/1994 | Keller et al. | 501/92 |
| 5,483,017 | 1/1996 | Keller et al. | 528/5 |
| 5,563,181 | 10/1996 | Keller et al. | 522/99 |

OTHER PUBLICATIONS

Ijadi–Maghsoodi et al, "Efficient, 'One Pot' Synthesis of Silylene–Acetylene and Disilyene–Acetylene Preceramic Polymers from Trichloroethylene" Journal of Polymer Science: Part A, vol. 28 (1990), 955–965.

Ijadi–Maghsoodi et al, "Synthesis and Study of Silylene–Diacetylene Polymers" 23 Macromolecules (1990), 4486–4487.

Son, DY et al, "Linear Siloxane–Acetylene Polymers as Precursors to High Temperature Materials" Fire and Polymers II, Gordon L Nelson, ed. ACS Symposium Series 599, American Chemical Society, 1995 Edition, Chapter 19, pp. 280–289.

Son DY et al, "Synthesis and characterization of Linear Siloxane–Diacetylene Polymers" Macromolecules 1995, 28, pp. 399–400.

Henderson, LJ et al, "Synthesis and characterization of Poly (carborane–siloxane–acetylene)" Macromolecules 1994, 27, pp. 1660–1661.

Keller et al, "Inorganic/Organic Hybrid Polymers (High Temperature, Oxidatively Stable)". Polymeric Materials Encyclopedia: Joseph C. Salamone, ed., CRC Press, New York vol. 5(H–L), pp. 3262–3269.

*Primary Examiner*—Margaret W. Glass
*Attorney, Agent, or Firm*—Thomas E. McDonnell; Ralph T. Webb

[57] ABSTRACT

A method of preparing a linear inorganic-organic hybrid polymer includes the steps of cooling a reaction medium to a first starting temperature below the ambient temperature and not less than about $-10°$ C., adding n-butyllithium and an organic compound capable of reacting with n-butyllithium to form an organo-dilithium compound to the reaction medium, allowing the organic compound and the n-butyllithium to react to form an organo-dilithium compound while allowing the reaction medium to warm, cooling the reaction medium to a second starting temperature below the ambient temperature and not less than about $-10°$ C., adding an inorganic compound containing at least two halogen atoms and capable of reacting with said organo-dilithium compound to form a linear inorganic-organic hybrid polymer to the reaction medium, and allowing the inorganic compound to react with the organo-dilithium compound to form a linear inorganic-organic hybrid polymer while allowing the reaction medium to warm to the ambient temperature. The cooling to the first and second starting temperatures may be accomplished by any method known in the art for cooling a reaction medium, for example by cooling with an ice water or salt/ice water bath or by cooling with an automated cooling or refrigerating system.

20 Claims, No Drawings

METHOD FOR SYNTHESIS OF LINEAR INORGANIC-ORGANIC HYBRID POLYMERS

BACKGROUND OF THE INVENTION

1. Field of the Invention

The invention relates to an improved, cost-effective method for synthesizing linear inorganic-organic hybrid polymers. In particular, the invention relates to a "one-pot" method of synthesizing linear inorganic-organic hybrid polymers using n-butyllithium as a reagent, the improvement being to carry out the steps of the synthesis at starting temperatures not lower than about −10° C.

2. Description of the Related Art

Methods for the synthesis of linear inorganic-organic hybrid polymers made up of silane and diacetylene units using n-butyllithium as a reagent are described by Ijadi-Maghsoodi et al. in *Efficient One-pot Synthesis of Silylene-Acetylene and Disilylene-Acetylene Preceramic Polymers from Trichloroethylene* published in Journal of Polymer Science,: Part A: Vol 28,(1990), pp 955–965, and by Ijadi-Maghsoodi et al. in *Synthesis and Study of Silylene-Diacetylene Polymers* published in 23 MACROMOLECULES pp. 4486 (1990), incorporated herein by reference in its entirety and for all purposes.

Methods for the synthesis of linear inorganic-organic thermoset polymers made up of carborane, siloxane or silane and acetylene units using n-butyllithium as a reagent are described in U.S. Pat. Nos. 5,272,237; 5,292,779; 5,348,917 and 5,483,017, each incorporated herein by reference in its entirety and for all purposes.

Each of the above references teaches that for synthesis steps using n-butyllithium, the reaction medium is initially cooled to a starting temperature of about −78° C., typically using a dry ice/acetone bath.

The use of dry ice/acetone to cool a reaction medium to −78° C. is inconvenient and expensive, particularly for scaled-up manufacturing. Consequently, it is an object of this invention to provide for an easier and less expensive method for synthesizing linear inorganic-organic hybrid polymers.

In particular, it is an object of this invention to provide for a method for synthesizing linear inorganic-organic hybrid polymers using n-butyllithium to create an organo-dilithium compound which is in turn reacted with a halogenated inorganic compound, wherein the method does not require a cooling step to −78° C.

Further, it is an object of this invention to provide for a method for synthesizing linear inorganic-organic hybrid polymers using n-butyllithium to create an organo-dilithium compound which is in turn reacted with a halogenated inorganic compound, wherein the method does not require that the reaction medium be cooled by a dry ice/acetone bath, a liquid nitrogen/organic solvent slurry or other extreme and expensive methods of cooling.

These and other objects are accomplished by a method of preparing a linear inorganic- organic hybrid polymer by the steps of cooling a reaction medium to a first starting temperature below the ambient temperature, adding n-butyllithium and an organic compound capable of reacting with n-butyllithium to form an organo-dilithium compound to the reaction medium, allowing the organic compound and the n-butyllithium to react to form an organo-dilithium compound while allowing the reaction medium to warm, cooling the reaction medium to a second starting temperature below the ambient temperature, adding a halogenated inorganic compound to the reaction medium, allowing the halogenated inorganic compound to react with the organo-dilithium compound to form a linear inorganic-organic hybrid polymer while allowing the reaction medium to warm to the ambient temperature, and wherein the improvement comprises carrying out the step of cooling the reaction medium to a first starting temperature below the ambient temperature and the step of cooling the reaction medium to a second starting temperature below the ambient temperature so that the first starting temperature and the second starting temperature, which may be the same or different, are not lower than about −10° C.

DETAILED DESCRIPTION OF THE PREFERRED EMBODIMENTS

The following detailed description of the invention is provided to aid those skilled in the art in practicing the present invention. However, the following detailed description of the invention should not be construed to unduly limit the present invention. Variations and modifications in the embodiments discussed may be made by those of ordinary skill in the art without departing from the scope of the present inventive discovery.

The invention relates to a method of preparing a linear inorganic-organic hybrid polymer comprising the steps of cooling a reaction medium to a first starting temperature below the ambient temperature and not less than about −10° C., adding n-butyllithium and an organic compound capable of reacting with n-butyllithium to form an organo-dilithium compound to the reaction medium, allowing the organic compound and the n-butyllithium to react to form an organo-dilithium compound while allowing the reaction medium to warm, cooling the reaction medium to a second starting temperature below the ambient temperature and not less than about −10° C., adding an inorganic compound containing at least two halogen atoms and capable of reacting with said organo-dilithium compound to form a linear inorganic-organic hybrid polymer to the reaction medium, and allowing the inorganic compound to react with the organo-dilithium compound to form a linear inorganic-organic hybrid polymer while allowing the reaction medium to warm to the ambient temperature. The cooling to the first and second starting temperatures may be accomplished by any method known in the art for cooling a reaction medium, for example by cooling with an ice water or salt/ice water bath or by cooling with an automated cooling or refrigerating system.

The first and second starting temperatures are selected to be low enough so that the reactions of n-butyllithium with the organic compound and of the organo-dilithium compound with the inorganic compound do not proceed in an uncontrolled fashion to create a dangerous condition or to create undesirable reaction products. The first and second starting temperatures are further selected to be high enough, in particular, greater than about −10° C., so that drastic and expensive cooling methods are not required. The method of the present invention for making inorganic-organic hybrid polymers is much more cost effective in comparison to previously reported methods, which require that the first and second starting temperatures be about −78° C. and which require drastic and expensive cooling methods, such as the use of a dry ice/acetone bath, a liquid nitrogen/organic solvent slurry or extreme refrigeration to reach such low temperatures.

During the reaction of n-butyllithium and the organic compound, the reaction medium is typically allowed to warm to the ambient temperature.

The method of the present invention is particularly well-suited for making poly(carborane-silane/siloxane-acetylene), poly(silane/siloxane-acetylene) and poly[(carborane-silane/siloxane-acetylene)(silane/siloxane-acetylene)] copolymers such as are described in U.S. Pat. Nos. 5,272,237; 5,292,779; 5,348,917 and 5,483,017. In particular, the organic compound mentioned above is preferably selected from the group consisting of trichloroethylene, hexachlorobutadiene, and

where n is an integer from 1 to 12. Most preferably the organic compound is hexachlorobutadiene. The inorganic compound mentioned above is preferably selected from the group consisting of compounds of the formula (1):

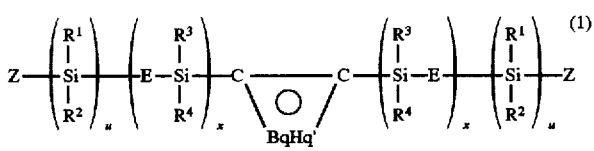

wherein (1) $R^1$, $R^2$, $R^3$ and $R^4$ are selected from the group consisting of alkyl, aryl, alkylaryl, haloalkyl, haloaryl and mixtures thereof;

(2)

represents a carboranyl group; and (3) q and q' are integers from 3 to 16;

(4) x represents an integer greater than or equal to zero;

(5) u is a positive integer;

(6) E is selected from the group consisting of O, an aliphatic bridge, an aryl bridge and mixtures thereof; and (7) Z is selected from the group consisting of F, Cl, Br and I; compounds of the formula (2):

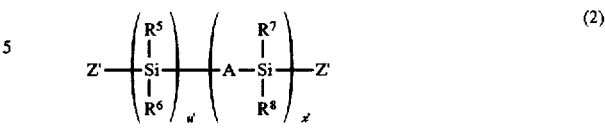

wherein:

(1) $R^5$, $R^6$, $R^7$ and $R^8$ are selected from the group consisting of alkyl, aryl, alkylaryl, haloalkyl, haloaryl and mixtures thereof;

(2) x' represents an integer greater than or equal to zero;

(3) u' a positive integer;

(4) Z' is selected from the group consisting of F, Cl, Br and I; and (5) A is selected from the group consisting of O, an aliphatic bridge, an aryl bridge and mixtures thereof, and mixtures of the compounds of formulas (1) and (2).

The carboranyl group in the compound of formula (1) is preferably selected from the group consisting of 1,7-dodecacarboranyl; 1,10-octacarboranyl; 1,6-octacarboranyl; 2,4-pentacarboranyl; 1,6-tetracarboranyl; 9-alkyl- 1,7-dodecacarboranyl; 9,10-dialkyl-1,7-dodecacarboranyl; 2-alkyl-1,10-octacarboranyl; 8-alkyl-1,6-octacarboranyl; decachloro-1,7-dodecacarboranyl; octachloro- 1,10-octacarboranyl; decafluoro- 1,7-dodecacarboranyl; octafluoro-1,10-octacarboranyl;closo-dodeca-ortho-carboranyl;closo-dodeca-meta-carboranyl;closo-dodecara-carboranyl and mixtures thereof. The inorganic compound is most preferably selected from the group consisting of 1,3-dichlorotetramethyldisiloxane, 1,7-bis(chlorotetramethyldisiloxy)-m-carborane and mixtures thereof.

The general chemical scheme for using n-butyllithium, hexachlorobutadiene and compounds of either formula (1) or formula (2) to make inorganic-organic hybrid polymers is represented by the exemplary synthesis given below:

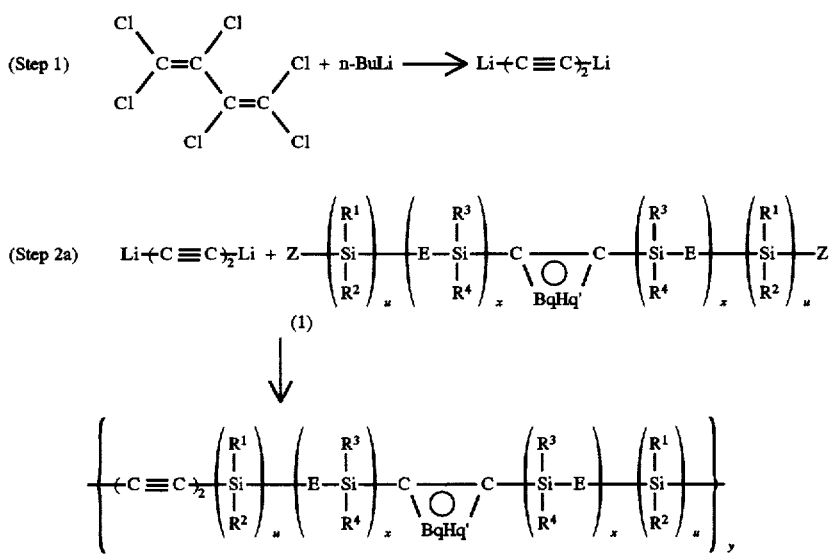

(Step 2b)  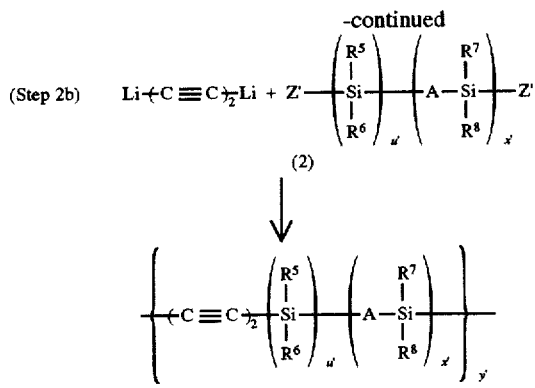

wherein u, u', y, y', $R^1$, $R^2$, $R^3$, $R^4$, $R^5$, $R^6$, $R^7$, $R^8$

q, q', x, x', Z, Z', A and E are as defined above, and n-BuLi represents n-butyllithium.

EXAMPLES

The following examples outline the preferred embodiments of the present invention in comparison with known methods.

Example 1

(Comparative Example) Preparation of 1,4-Dilithio-1,3-Butadiyne at −78° C.

A hexane solution of n-butyllithium (10.6 mL of a 2.5M solution, 26.5 mmol) was added to a flask containing THF (5 mL) cooled in a dry ice/acetone bath to −78° C. Subsequently, hexachlorobutadiene (0.99 mL, 6.3 mmol) was added dropwise via syringe, resulting in the formation of a heavy precipitate. After completion of addition, the cold bath was removed and the reaction mixture was stirred at room temperature for two hours. The resulting dark-brown mixture was used without further treatment.

Example 2

(Comparative Example) Synthesis of Poly [(Carborane-Siloxane-Acetylene)(Siloxane-Acetylene)] Copolymer by Addition of Reactants at −78° C.

A mixture of 1,4-dilithio-1,3-butadiyne (6.3 mmol), prepared from hexachlorobutadiene and n-butyllithium as in Example 1, in THF/hexane was cooled in a dry ice/acetone bath to −78° C.). To this mixture a homogeneous mixture of 1,7-bis(chlorotetramethyldisiloxy)-m-carborane (1.43 mL, 3.15 mmol) and 1,3-dichlorotetramethyldisiloxane (0.62 mL, 3.15 mmol) was added dropwise over a period of 10 min. After addition, the cold bath was removed and the mixture was allowed to warm to room temperature. At approximately −20° C. to −15° C., it was noted that a precipitation commenced to form attributed to the formation of lithium chloride. The tan mixture was then poured into an ice-cooled solution of saturated aqueous ammonium chloride (30 mL) with stirring. The resulting two-phase mixture was filtered through a Celite pad and the layers were separated. The aqueous layer was extracted twice with diethyl ether and the combined organic layers were washed twice with distilled water and once with saturated aqueous sodium chloride solution. The organic layer was dried over anhydrous magnesium sulfate and filtered. Most of the volatiles were removed under reduced pressure at room temperature and the residue was heated at 75° C. for three hours at 0.1 torr to give 1.81 g (90%) of a poly [(carborane-siloxane-acetylene)(siloxane-acetylene)] copolymer as a viscous dark brown material.

Example 3

(Comparative Example) Synthesis of Poly (Siloxane-Acetylene) by Addition of Reactants at −78° C.

A mixture of 1,4-dilithio-1,3-butadiyne (6.3 mmol), prepared as in Example 1, in THF/hexane was cooled in a dry ice/acetone bath to −78° C. To this mixture, 1,3-dichlorotetramethyldisiloxane (1.24 mL, 6.3 mmol) was added dropwise over 15 min. After addition, the cold bath was removed and the mixture was stirred at room temperature for two hours. At approximately −20° C. to −15° C., it was noted that a precipitation commenced to form attributed to the formation of lithium chloride. The tan mixture was poured into 20 mL of ice-cooled saturated aqueous ammonium chloride solution with stirring. The mixture was filtered through a Celite pad and the layers were separated. The aqueous layer was extracted twice with diethyl ether and the combined organic layers were washed twice with distilled water and once with saturated aqueous NaCl solution. The dark brown organic layer was dried over anhydrous magnesium sulfate and filtered. Most of the volatiles were removed at reduced pressure and the residue was heated at 75 ° C. for three hours at 0.1 torr to give poly (siloxane-acetylene) as a thick, dark brown material (1.04 g, 92%). Poly (siloxane-acetylene) slowly solidifies on standing at room temperature and liquefies at approximately 70° C.

Example 4

(Comparative Example) Preparation of Poly (Carborane-Siloxane-Acetylene) by Addition of Reactants at −78° C.

A mixture of 1,4-dilithio-1,3-butadiyne (21.4 mmol), prepared as in Example 1, in THF/hexane was cooled in a dry ice/acetone bath to −78° C. At this time, an equal-molar amount of 1,7-bis(chlorotetramethyldisiloxyl)-m-carborane (10.22 g, 21.4 mmol) in 4.0 ml THF was added dropwise while stirring. The temperature of the reaction mixture was allowed to slowly rise to room temperature. While stirring the mixture for 1 hour, a copious amount of white solid (LiCl) was formed. The reaction mixture was poured into 100 ml of dilute hydrochloric acid resulting in dissolution of the salt and the separation of a viscous oil. The polymer was extracted into two portions of diethyl ether. The combined ethereal layer was washed several times with water until the washing was neutral, separated, and dried over anhydrous sodium sulfate. The ether was evaporated at reduced pressure leaving a dark-brown viscous polymer. GPC indicated the presence of low molecular weight species ($\approx 500$) as well as higher average molecular weight polymers (Mw$\approx$4900, Mn$\approx$2400). Heating under vacuum at 150° C. removed lower molecular weight volatiles giving a 92% overall yield of poly (carborane-siloxane-acetylene.

Example 5

Preparation of 1,4-Dilithio-1,3-Butadiyne Using Ice as Coolant to Control Temperature.

A hexane solution of n-butyllithium (10.6 mL of a 2.5M solution, 26.5 mmol) was added to a flask containing THF (5 mL) cooled with ice to approximately 4° C. Subsequently, hexachlorobutadiene (1.0 ml, 6.3 mmol) was added dropwise via syringe, resulting in the formation of a heavy precipitate (LiCl). After completion of addition, the ice bath was removed and the reaction mixture was stirred at room temperature for two hours. The resulting dark-brown mixture was used without further treatment.

Example 6

Preparation of Poly (Carborane-Siloxane-Acetylene) Using Ice as Coolant to Control Temperature.

A mixture of 1,4-dilithio-1,3-butadiyne (6.3 mmol) prepared as in Example 5 in THF/hexane was cooled in ice to approximately 4° C. To this mixture, 1,7-bis (chlorotetramethyldisiloxy)-m-carborane (2.82 mL., 6.21 mmol) was added dropwise over 15 min. During the addition, an increase in the reaction temperature and a copious amount of precipitate attributed to lithium chloride was observed. After the addition, the ice bath was removed and the mixture was stirred at room temperature for two hours. The tan mixture was poured into 30 mL of ice-cooled saturated aqueous ammonium chloride solution with stirring. The mixture was filtered through a Celite pad and the layers were separated. The aqueous layer was extracted twice with diethyl ether and the combined organic layers were washed twice with distilled water and once with saturated aqueous NaCl solution. The dark brown organic layer was dried over anhydrous magnesium sulfate and filtered. Most of the volatiles were removed at reduced pressure and the residue was heated at 75° C. for three hours at 0.1 torr to give poly (carborane-siloxane-acetylene) as a thick, dark brown material (2.57 g, 90%).

Example 7

Synthesis of Poly(Siloxane-Acetylene) Using Ice as Coolant to Control Temperature A mixture of 1,4-dilithio-1,3-butadiyne (6.3 mmol) prepared as in Example 5 in THF/hexane was cooled in ice to approximately 4° C. To this mixture, 1,3-dichlorotetramethyldisiloxane (1.24 mL, 6.3 mmol) was added dropwise over 15 min. During the addition, an increase in the reaction temperature and a copious amount of precipitate attributed to lithium chloride was observed. After the addition, the ice bath was removed and the mixture was stirred at room temperature for two hours. The tan mixture was poured into 20 mL of ice-cooled saturated aqueous ammonium chloride solution with stirring. The mixture was filtered through a Celite pad and the layers were separated. The aqueous layer was extracted twice with diethyl ether and the combined organic layers were washed twice with distilled water and once with saturated aqueous NaCl solution. The dark brown organic layer was dried over anhydrous magnesium sulfate and filtered. Most of the volatiles were removed at reduced pressure and the residue was heated at 75° C. for three hours at 0.1 torr to give poly (siloxane-acetylene) as a thick, dark brown material (1.04 g, 92%). Poly (siloxane-acetylene) slowly solidifies on standing at room temperature and liquefies at approximately 70° C.

Example 8

Synthesis of Poly [(Carborane-Siloxane-Acetylene) (Siloxane-Acetylene)] Copolymer Using Ice as Coolant to Control Temperature.

A mixture of 1,4-dilithio-1,3-butadiyne (6.3 mmol) prepared as in Example 5 in THF/hexane was cooled in ice to approximately 4° C. To this mixture a homogeneous mixture of 1,7-bis(chlorotetramethyldisiloxy)-m-carborane (1.43 mL, 3.15 mmol) and 1,3-dichlorotetramethyldisiloxane (0.62 mL, 3.15 mmol) was added dropwise over a period of 15 min. During the addition, an increase in the reaction temperature and a copious amount of precipitate attributed to lithium chloride was observed. After the addition, the ice bath was removed and the mixture was allowed to warm to room temperature. The tan mixture was then poured into an ice-cooled solution of saturated aqueous ammonium chloride (30 mL) with stirring. The resulting two-phase mixture was filtered through a Celite pad and the layers were separated. The aqueous layer was extracted twice with diethyl ether and the combined organic layers were washed twice with distilled water and once with saturated aqueous sodium chloride solution. The organic layer was dried over anhydrous magnesium sulfate and filtered. Most of the volatiles were removed under reduced pressure at room temperature and the residue was heated at 75° C. for three hours at 0.1 torr to give 1.85 g (93%) of a poly [(carborane-siloxane-acetylene)(siloxane-acetylene)] copolymer as a viscous dark brown material.

Obviously, many modifications and variations of the present invention are possible in light of the above teachings. It is therefore to be understood that, within the scope of the appended claims, the invention may be practiced otherwise than as specifically described.

What is claimed is:

1. A method of preparing a linear inorganic-organic hybrid polymer comprising the steps of cooling a reaction medium to a first starting temperature below the ambient temperature, adding n-butyllithium and an organic compound capable of reacting with n-butyllithium to form an organo-dilithium compound to the reaction medium, allowing the organic compound and the n-butyllithium to react to form an organo-dilithium compound while allowing the reaction medium to warm, cooling the reaction medium to a second starting temperature below the ambient temperature, adding an inorganic compound containing at least two halogen atoms and capable of reacting with said organo-dilithium compound to form a linear inorganic-organic hybrid polymer to the reaction medium, and allowing the inorganic compound to react with the organo-dilithium compound to form a linear inorganic-organic hybrid polymer while allowing the reaction medium to warm to the ambient temperature, wherein the improvement comprises carrying out the step of cooling the reaction medium to a first starting temperature below the ambient temperature and the step of cooling the reaction medium to a second starting temperature below the ambient temperature wherein the first starting temperature and the second starting temperature may be the same or different and wherein the first starting temperature and the second starting temperature are not lower than about −10° C.

2. The method of claim 1 wherein the step of cooling the reaction medium to a first starting temperature is accomplished by means of an ice water bath.

3. The method of claim 1 wherein the step of cooling the reaction medium to a first starting temperature is accomplished by means of a salt/ice water bath.

4. The method of claim 1 wherein the step of cooling the reaction medium to a first starting temperature is accomplished by means of an automated cooling system.

5. The method of claim 1 wherein the step of cooling the reaction medium to a second starting temperature is accomplished by means of an ice water bath.

6. The method of claim 1 wherein the step of cooling the reaction medium to a second starting temperature is accomplished by means of a salt/ice water bath.

7. The method of claim 1 wherein the step of cooling the reaction medium to a second starting temperature is accomplished by means of an automated cooling system.

8. The method of claim 1 wherein said organic compound is selected from the group consisting of trichloroethylene, hexachlorobutadiene, and

where n is an integer from 1 to 12.

9. The method of claim 1 wherein said inorganic compound is selected from the group consisting of compounds of the formula (1):

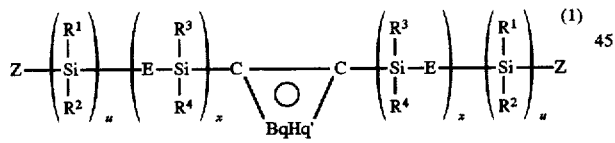

wherein
(1) $R^1$, $R^2$, $R^3$ and $R^4$ are selected from the group consisting of alkyl, aryl, alkylaryl, haloalkyl, haloaryl and mixtures thereof;
(2)

represents a carboranyl group; and
(3) q and q' are integers from 3 to 16;
(4) x represents an integer greater than or equal to zero;
(5) u is a positive integer;
(6) E is selected from the group consisting of O, an aliphatic bridge, an aryl bridge and mixtures thereof, and (4) Z' is selected from the group consisting of F, Cl, Br and I; compounds of the formula (2):

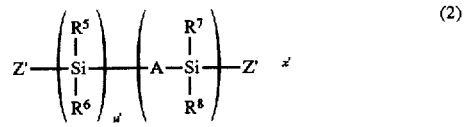

wherein:
(1) $R^5$, $R^6$, $R^7$ and $R^8$ are selected from the group consisting of alkyl, aryl, alkylaryl, haloalkyl, haloaryl and mixtures thereof;
(2) x' represents an integer greater than or equal to zero;
(3) u' a positive integer;
(4) Z' is selected from the group consisting of F, Cl, Br and I; and
(5) A is selected from the group consisting of O, an aliphatic bridge, an aryl bridge and mixtures thereof, and mixtures of the compounds of formulas (1) and (2).

10. The method of claim 9 wherein said carboranyl group is selected from the group consisting of 1,7-dodecacarboranyl; 1,10-octacarboranyl; 1,6-octacarboranyl; 2,4-pentacarboranyl; 1,6-tetracarboranyl; 9-alkyl- 1,7-dodecacarboranyl; 9,10-dialkyl- 1,7-dodecacarboranyl; 2-alkyl- 1,10-octacarboranyl; 8-alkyl- 1,6-octacarboranyl; decachloro-1,7-dodecacarboranyl; octachloro- 1,10-octacarboranyl; decafluoro-1,7-dodecacarboranyl; octafluoro-1,10-octacarboranyl; closo-dodeca-ortho-carboranyl; closo-dodeca-meta-carboranyl; closo-dodeca-para-carboranyl and mixtures thereof.

11. The method of claim 1 wherein said inorganic compound is selected from the group consisting of 1,3-dichlorotetramethyldisiloxane, 1,7-bis(chlorotetramethyldisiloxy)-m-carborane and mixtures thereof.

12. A method of preparing a linear inorganic-organic hybrid polymer comprising the steps of cooling a reaction medium to a first starting temperature below the ambient temperature, adding n-butyllithium and an organic compound selected from the group consisting of trichloroethylene, hexachlorobutadiene, and

where n is an integer from 1 to 12, to the reaction medium, allowing the organic compound and the n-butyllithium to react to form an organo- dilithium compound while allowing the reaction medium to warm, cooling the reaction medium to a second starting temperature below the ambient temperature, adding an inorganic compound selected from the group consisting of compounds of formula (1):

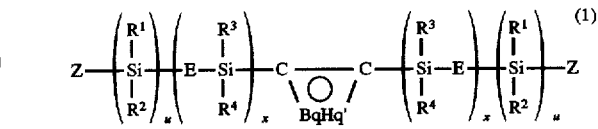

wherein
(1) $R^1$, $R^2$, $R^3$, $R^4$, are selected from the group consisting of alkyl, aryl, alkylaryl, haloalkyl, haloaryl and mixtures thereof;

(2)

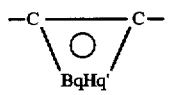

represents a carboranyl group; and (3) q and q' are integers from 3 to 16;

(4) x represents an integer greater than or equal to zero;

(5) u is a positive integer;

(6) E is selected from the group consisting of O, an aliphatic bridge, an aryl bridge and mixtures thereof, and (7) Z is selected from the group consisting of F, Cl, Br and I; compounds of formula (2)

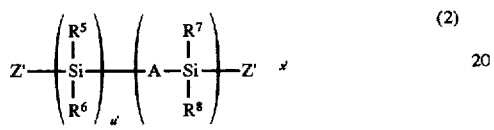

wherein:

(1) $R^5$, $R^6$, $R^7$ and $R^8$ are selected from the group consisting of alkyl, aryl, alkylaryl, haloalkyl, haloaryl and mixtures thereof, (2) x' represents an integer greater than or equal to zero;

(3) u' a positive integer;

(4) Z' is selected from the group consisting of F, Cl, Br and I; and (5) A is selected from the group consisting of O, an aliphatic bridge, an aryl bridge and mixtures thereof, and mixtures of compounds of said formulas (1) and (2) to the reaction medium, and allowing the inorganic compound to react with the organo-dilithium compound to form a linear inorganic-organic hybrid polymer while allowing the reaction medium to warm to the ambient temperature, wherein the improvement comprises carrying out the step of cooling the reaction medium to a first starting temperature below the ambient temperature and the step of cooling the reaction medium to a second starting temperature below the ambient temperature wherein the first starting temperature and the second starting temperature may be the same or different and wherein the first starting temperature and the second starting temperature are not lower than about −10° C.

13. The method of claim 12 herein said carboranyl group is selected from the group consisting of 1,7-dodecacarboranyl; 1,10-octacarboranyl; 1,6-octacarboranyl; 2,4-pentacarboranyl; 1,6-tetracarboranyl; 9-alkyl- 1,7-dodecacarboranyl; 9,10-dialkyl- 1,7-dodecacarboranyl; 2-alkyl-1,10-octacarboranyl; 8-alkyl- 1,6-octacarboranyl; decachloro- 1,7-dodecacarboranyl; octachloro- 1,10-octacarboranyl; decafluoro- 1,7-dodecacarboranyl; octafluoro- 1,10-octacarboranyl; closo-dodeca-ortho-carboranyl; closo-dodeca-meta-carboranyl; closo-dodeca-para-carboranyl and mixtures thereof.

14. A method of preparing a linear inorganic-organic hybrid polymer comprising the steps of cooling a reaction medium to a first starting temperature below the ambient temperature, adding n-butyllithium and hexachlorobutadiene to the reaction medium, allowing the hexachlorobutadiene and the n-butyllithium to react to form 1,4-dilithio- 1,3-butadiyne while allowing the reaction medium to warm to the ambient temperature, cooling the reaction medium to a second starting temperature below the ambient temperature, adding an inorganic compound selected from the group consisting of 1,3-dichlorotetramethyldisiloxane, 1,7-bis(chlorotetramethyldisiloxy)-m-carborane and mixtures thereof to the reaction medium, and allowing the inorganic compound to react with the 1,4-dilithio-1,3-butadiyne to form a linear inorganic-organic hybrid polymer while allowing the reaction medium to warm to the ambient temperature, wherein the improvement comprises carrying out the step of cooling the reaction medium to a first starting temperature below the ambient temperature and the step of cooling the reaction medium to a second starting temperature below the ambient temperature wherein the first starting temperature and the second starting temperature may be the same or different and wherein the first starting temperature and the second starting temperature are not lower than about −10° C.

15. The method of claim 14 wherein the step of cooling the reaction medium to a first starting temperature is accomplished by means of an ice water bath.

16. The method of claim 14 wherein the step of cooling the reaction medium to a first starting temperature is accomplished by means of a salt/ice water bath.

17. The method of claim 14 wherein the step of cooling the reaction medium to a first starting temperature is accomplished by means of an automated cooling system.

18. The method of claim 14 wherein the step of cooling the reaction medium to a second starting temperature is accomplished by means of an ice water bath.

19. The method of claim 14 wherein the step of cooling the reaction medium to a second starting temperature is accomplished by means of a salt/ice water bath.

20. The method of claim 14 wherein the step of cooling the reaction medium to a second starting temperature is accomplished by means of an automated cooling system.

* * * * *